United States Patent [19]

Martinez et al.

[11] Patent Number: 4,651,468

[45] Date of Patent: Mar. 24, 1987

[54] METHOD AND APPARATUS FOR NATURAL FERTILIZATION AND IRRIGATION OF PLANTS

[75] Inventors: Egmont U Martinez; Jesus G. Martinez, both of Mexico, Mexico; Gary W. Harrell, Plainview, Tex.

[73] Assignee: Systemic Nutrigation Concepts, Plainview, Tex.

[21] Appl. No.: 590,955

[22] Filed: Mar. 19, 1984

[51] Int. Cl.⁴ .............................................. A01G 25/00
[52] U.S. Cl. ........................................ 47/80; 47/57.5; 47/48.5
[58] Field of Search ................... 47/80, 48.5, 57.6, 79, 47/1, 17, 27; 202/232

[56] References Cited

U.S. PATENT DOCUMENTS

| | | | |
|---|---|---|---|
| 792,950 | 6/1905 | Warner | 47/51 |
| 1,999,458 | 4/1935 | Hollister | 47/57.5 |
| 3,282,327 | 11/1966 | Hardy et al. | 202/234 |
| 3,295,254 | 1/1967 | Schoonman | 47/57.5 |
| 3,336,206 | 8/1967 | Sasaki et al. | 47/48.5 |
| 3,558,436 | 1/1971 | Foley et al. | 202/234 |
| 4,141,798 | 2/1979 | Grosse | 47/17 |
| 4,235,561 | 11/1980 | Peterson | 47/48.5 |
| 4,300,309 | 11/1981 | Mincy | 47/48.5 |
| 4,308,689 | 1/1982 | Jenson et al. | 47/57.5 |
| 4,383,543 | 5/1983 | Rawlins | 47/80 |

FOREIGN PATENT DOCUMENTS 1038437  8/1966  United Kingdom ................. 47/57.5

Primary Examiner—Robert A. Hafer
Assistant Examiner—Bradley M. Lewis
Attorney, Agent, or Firm—Litman, Day & McMahon

[57] ABSTRACT

A method and apparatus for providing natural fertilization and irrigation is designed to preserve the osmotic, chemical and electric natural equilibrium of plants. More specifically, the method and apparatus relies upon negative sap pressure within plants which facilitates the providing of water, fertilizers, gases, and other chemicals in the exact amounts needed by the plants. The apparatus includes a porous ceramic implant in a plant stem with liquid being provided by capillary action to the implant from an external source. The plant will draw liquid through the porous implant in proportion to the amount needed by the plant. A passive solar distiller also forms a part of the method and apparatus of the invention.

5 Claims, 16 Drawing Figures

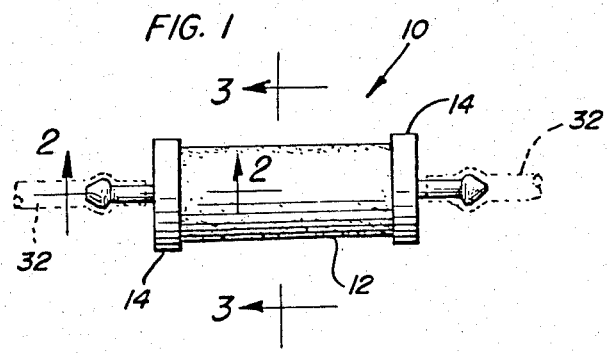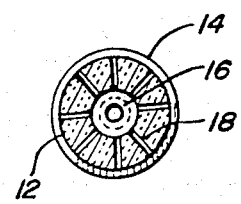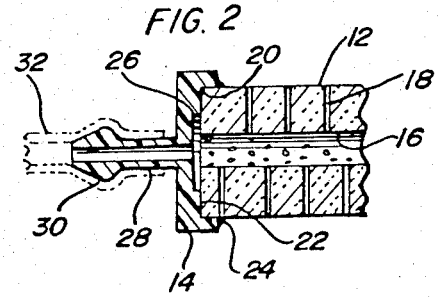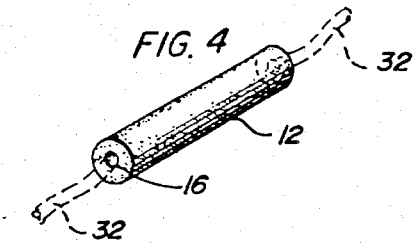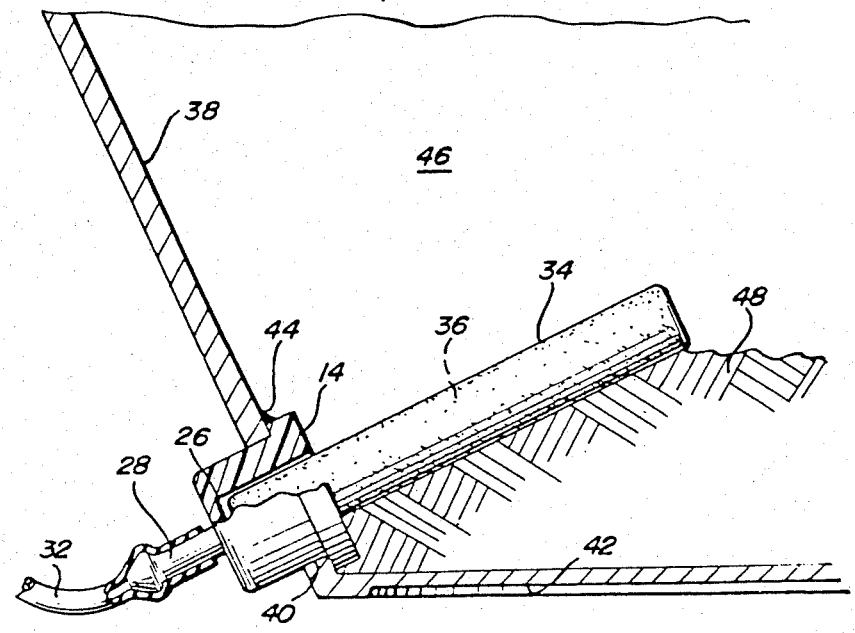

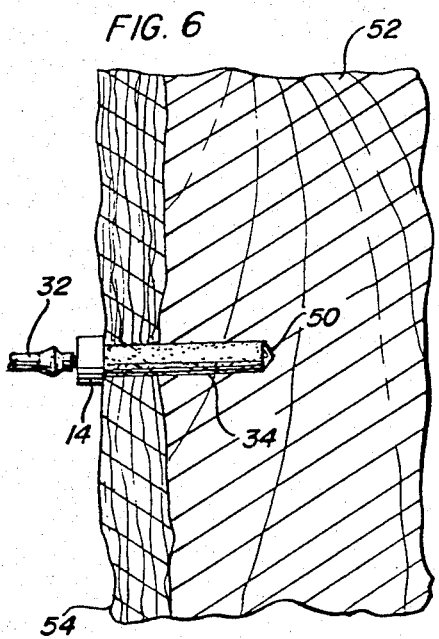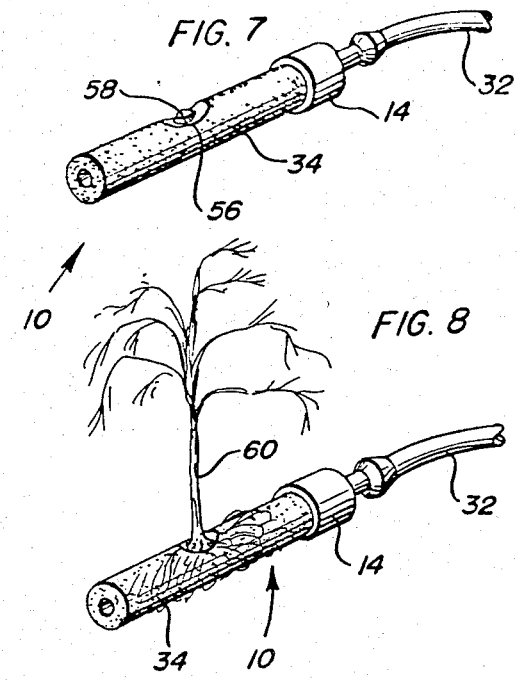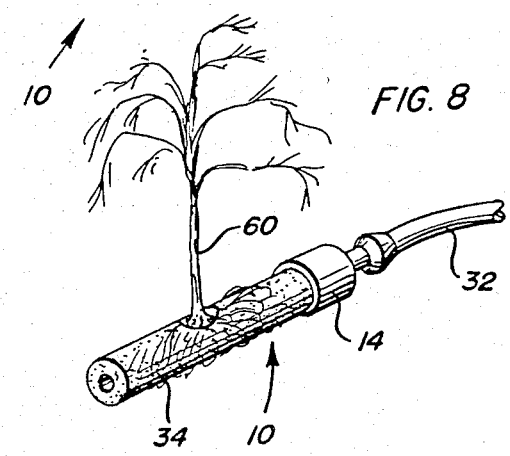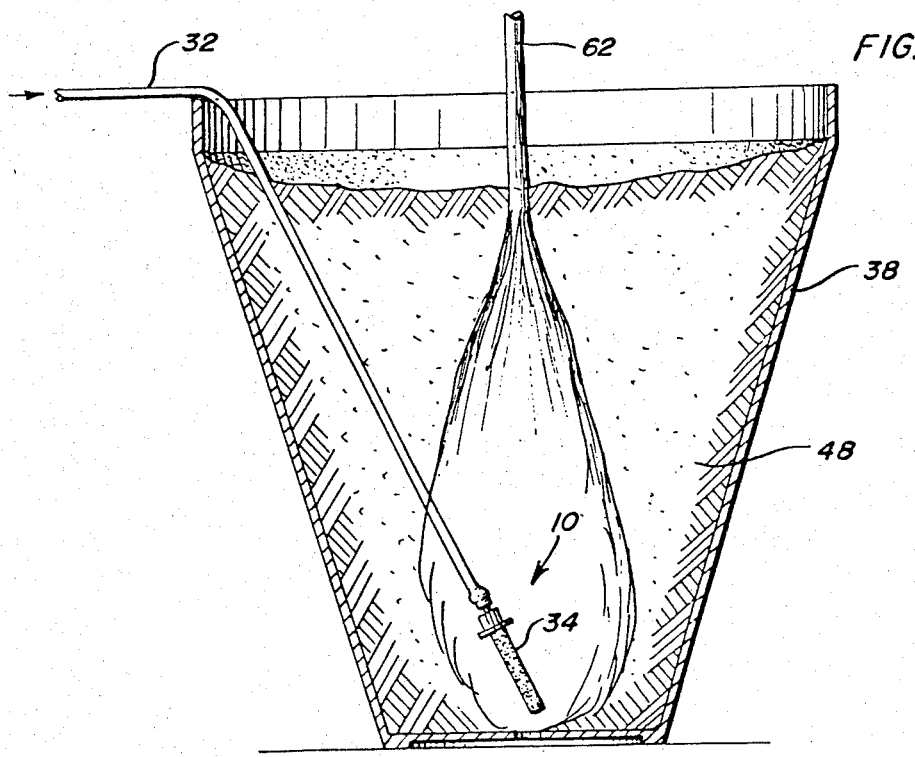

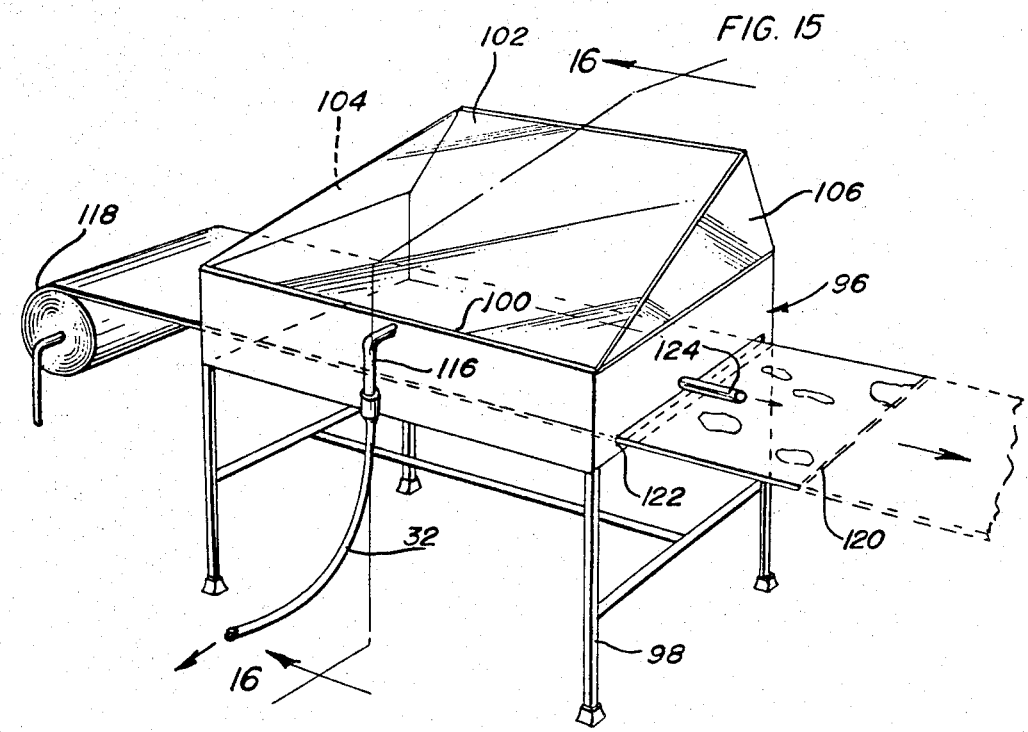
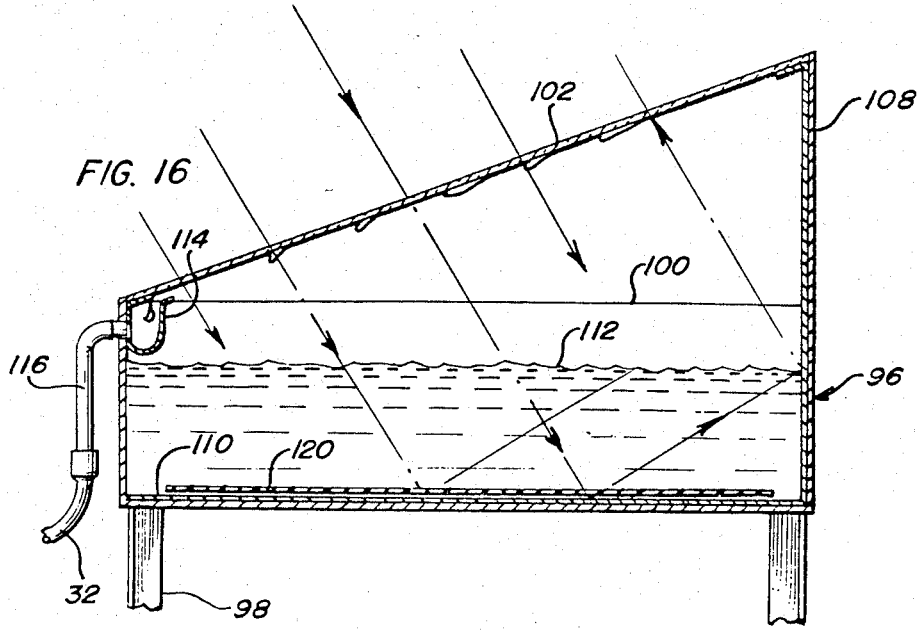

METHOD AND APPARATUS FOR NATURAL FERTILIZATION AND IRRIGATION OF PLANTS

BACKGROUND OF THE INVENTION

1. Description of the Invention

The present invention relates to the irrigation and fertilization of plants, and more particularly pertains to new and improved methods and apparatuses for effecting such irrigation and fertilization in a much more efficient manner and at a substantially reduced cost.

2. Description of the Prior Art

As can be appreciated, literally thousands of different techniques and devices have been developed which are designed to improve upon existing irrigation and fertilization processes for plants. These techniques and devices include utilizing open water channels which overflow into areas of cultivation. This particular method suffers from wastage due to evaporation. Other attempts at efficient irrigation have included the use of capillary wick systems, but these are impractical over large areas. Also, underground pipes with holes or intervals have been tried without much success. This latter arrangement has the disadvantage that the pipes can be blocked by plant root systems if the plants are remote from the pipes. Also, if fertilizer is dissolved or suspended in the irrigation water, some of the fertilizer along with the water will not reach the plants and this waste fertilizer only serves to fertilize weeds and other unwanted vegetation. Other more promising techniques investigated have been those that utilize injector devices which may be inserted directly into plant stems or proximate their root systems. These injectors, which are typically of a perforated or porous construction, may be directly connected to a pressurized source of liquid, such as water or a liquid fertilizer, and the liquid may then be forced into the plant stem or into the soil surrounding the roots.

The prior art is replete with examples of such injectors utilized in the pressurized watering or feeding of plants. For example, U.S. Pat. No. 349,874, which issued to J. Buhrer on Sept. 28, 1886, illustrates an early construction for an injector which was designed for carrying liquid or semi-liquid fertilizers to the roots of trees and to the lower soil strata. This early device essentially consisted of a pipe open at both ends and having perforated sides, and further having a cover for closing the upper end. The pipes were set in the ground with their upper ends approximately level with the ground surface, and the liquid could then be poured directly into the pipe whereby it would flow through the perforations to the plant root system. While the Buhrer device most likely functions in its desired manner, this type of injector feeder requires the constant attention of a user inasmuch as each injector must be continually refilled with liquid on a frequent basis. Further, this type of device is not designed to accurately meter the amount of liquid delivered to a plant, whereby a substantial loss of liquid may occur directly into the soil—especially in view of the fact that much of the liquid may never directly come into contact with a plant root system.

On Oct. 18, 1904, a patent was issued to O. Berger with the device disclosed therein being directed to an insecticide tube directly positionable in a plant stem. The Berger device consisted of a tube having lateral perforations and adapted to be inserted in the body or root of a plant, with a portion of the tube being designed to angulate upwardly externally of the plant and serving as a receptacle and feeder for the composition with which the tube is filled. As such, a continual supply of insecticide could be delivered interiorly of the plant. This type of device was most probably never utilized commercially inasmuch as it also requires constant attention on the part of a user. In this regard, the tube would have to be continually recharged with insecticide on a frequent basis and, coupled with the difficulty of inserting the tube in the plant, it would appear to be infeasible from a commercial standpoint.

In U.S. Pat. No. 1,401,386, which issued to G. Wooderry on Dec. 27, 1921, a more improved irrigating system is described. This patent notes the fact that irrigating from and through the top surface of soil is very inefficient. In discussing this problem, the disclosure notes that the soil must first be prepared properly before any irrigation from the surface can be commenced and also that it takes an enormous amount of water to irrigate from the surface down to the roots of plants. In attempting to reduce the amount of water required for such irrigation, the Woodberry device includes the positioning beneath the soil surface of a conduit through which a supply of water may be delivered. Spaced at intervals along the conduit are porous concrete or mortar members which include interior hollow chambers. The supplied water is directed into these interior chambers and seeps outwardly through the porous walls into the soil so as to effect the desired irrigation. In an alternative embodiment, Woodberry dispenses with the individual porous containers and relies instead upon a continuous length of porous conduit, which is embedded in the soil. While this apparatus and method more accurately controls the amount and distribution of water to plants, again no provision is made to deliver exactly the amount of water needed by a plant and as such, a substantial amount of water is wasted.

Continuing with a discussion of the state of the art of plant injectors, reference is made to British Pat. No. 177,426, which issued to E. Burnet on Mar. 30, 1922. The Burnet device includes a nail which may be driven into a tree trunk, with such nail having a hollow tube concentrically positioned around its shank. As such, the hollow tube is also driven into the tree trunk with the nail, and the nail may then be removed to leave the hollow tube in the trunk. Burnet noted that liquids of a stimulating or nutritive character could then be poured into the hollow tube for introduction into the plant system. Again, however, this type of device requires constant attention on the part of the user and is, as such, difficult to use and impractical.

In a continuing effort to improve these similar methods of irrigation and fertilization, British Pat. No. 457,083 was issued to O. Stelzel on Nov. 20, 1936. The Stelzel device consisted essentially of a plurality of injectors attached to a common conduit having a pressurized water supply therein. The individual injectors include lower perforated sections through which water may be ejected, and a plurality of the injectors could then be circuitously positioned about a plant and driven into the soil proximate the plant's root system. This type of device constituted an attempt to more evenly distribute the water supply about a plant root system, but it also suffered from the problem of not being able to provide precisely the amount of water needed or being able to particularly insure that the water was distributed evenly to the complete root system.

In U.S. Pat. No. 3,758,987, which issued to W. Crane on Sept. 18, 1973, there is disclosed an automatic plant watering device which is described as being responsive to a plant's need for water. The device includes a porous element that is inserted into the soil proximate a plant root system and responds to the moisture content of the soil to control the supply of water from a substantially airtight enclosure. The porous element is of a wafer-like construction and may be typically formed from a porous ceramic material. Water will seep through the porous filter element when the soil is dry; however, this type of watering action does not necessarily respond to the amount of water needed by the particular plant and further, much water is then wasted since it is delivered directly to the soil and not the plant.

Another patent of interest with respect to injector devices is U.S. Pat. No. 3,992,813, which issued to Freshel on Nov. 23, 1976. The system disclosed in this patent comprises a plurality of injector assemblies, with each injector essentially consisting of a pipe insertible in an opening in a tree. Hoses may be attached to the individual injectors, and the hoses may then be utilized to connect various pressurized liquid fungicide containers to the injectors. As such, a pressurized feeding of a liquid fungicide into the tree system can be effected. The invention disclosed in this patent, as with most of the above-discussed inventions, relies upon the forced pressurized injection of a liquid into a plant system and is not designed to deliver only that amount of liquid as is actually needed.

In summary, the above review of the state of the art reveals that none of the currently known injector arrangements are designed to deliver only that amount of liquid to a plant which the plant actually requires. It is interesting to note that where the injector assemblies are positioned in the soil proximate a plant root system, up to 99.5 percent or more of the liquid may be wasted since only a very small amount of the liquid will be absorbed into the plant. Where the injectors are inserted directly into a plant stem, the pressurized feeding of the liquid may result in damage to the plant since too much liquid may be delivered thereto. Accordingly, it is apparent that there is a continuing need for improvements in the methods and apparatuses of the prior art whereby a more precise delivery of liquid to a plant could be accomplished, and in this respect, the present invention substantially fulfills this need.

SUMMARY OF THE INVENTION

The general purpose of the present invention, which will be described subsequently in greater detail, is to provide new and improved methods and apparatuses for providing irrigation, metabolic modifications, fertilization and insecticides to plants which have all of the advantages of the prior art methods and apparatuses and none of the disadvantages. To attain this, the present invention envisions the use of a porous ceramic implant which may be permanently positioned within a hole drilled in a plant stem. The implant is connected to an external supply of gases or liquids, such as water, fertilizer, insecticide, or the like, and the liquid is then permitted to seep by capillary action through the implant into the plant life system. This seepage is effected by the natural negative sap pressure within the plant, i.e., the invention recognizes the fact that a plant naturally determines the amount of water or fertilizer needed and will draw only that amount into its system. When no negative sap pressure is present, no seepage through the ceramic implant will occur.

The invention may also be utilized to withdraw nutrients from one plant and to deliver the same to another plant—depending upon the depth and positioning of the implant within the individual plants. Additionally, a passive solar distiller may be utilized in combination with the invention whereby a continual minute supply of water may be delivered to the individual implants, thus further eliminating the necessity of frequent user attention.

It is therefore an object of the present invention to provide new and improved methods and apparatuses for effecting continual and efficient liquid or gas delivery to plant systems which have all of the advantages of the prior art liquid delivery systems and none of the disadvantages.

It is another object of the present invention to provide new and improved apparatuses for facilitating liquid delivery to plant systems which may be easily and efficiently manufactured and marketed.

It is a further object of the present invention to provide new and improved apparatuses for facilitating liquid or gas delivery to plant systems which may be efficiently and reliably interconnected with plants.

Even another object of the present invention is to provide new and improved apparatuses for facilitating liquid or gas delivery to plants which are of a durable and rugged construction.

Still another object of the present invention is to provide new and improved apparatuses which facilitate the delivery of liquids or gases to plants wherein such apparatuses, and their associated methods of use, preserve the natural osmotic, chemical and electrical equilibrium of said plants.

Yet another object of the present invention is to provide new and improved methods and apparatuses for facilitating the delivery of liquids or gases to plants wherein a provision is made to naturally precisely and exactly control the amount of such liquid delivery to said plants.

Still yet another object of the present invention is to provide new and improved apparatuses and methods which facilitate the delivery of liquids to plants wherein such apparatuses and methods may also be employed to deliver liquids between plants.

Even yet another object of the present invention is to provide new and improved irrigation methods and apparatuses for plants wherein the amount of water required to effect such irrigation is substantially reduced.

Yet still another object of the present invention is to provide new methods and apparatuses for facilitating the delivery of liquids or gases to plants wherein such methods and apparatuses substantially eliminate frequent attention by users.

Still even another object of the present invention is to provide new methods and apparatuses for facilitating plant irrigation wherein such methods and apparatuses may be operated in combination with a passive solar distiller.

An even further object of the present invention is to provide new and improved apparatuses for facilitating the delivery of liquids or gases wherein such apparatuses are susceptible of a low cost of manufacture with regard to both materials and labor, and which accordingly are then susceptible of low prices of sale to the consuming public, thereby making such apparatuses economically available to the buying public.

Even still another object of the present invention is to provide new and improved liquid or gas delivery apparatuses and methods for plants which provide in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The foregoing features and other aspects of the invention will be explained in greater detail when the following description is read and taken in conjunction with the accompanying drawings wherein:

FIG. 1 is a plan view of the implant forming a part of the present invention.

FIG. 2 is a partial cross-sectional view of the invention taken along the line 2—2 in FIG. 1.

FIG. 3 is a cross-sectional view of the invention taken along the line 3—3 in FIG. 1.

FIG. 4 is a perspective view of the porous element forming a part of the present invention.

FIG. 5 is a partial plan view, partly in cross-section, illustrating one manner of usage of the present invention.

FIG. 6 is a partial plan view illustrating a further method of usage of the present invention.

FIG. 7 is a perspective view illustrating a modified embodiment of the present invention.

FIG. 8 is a perspective view illustrating the manner of usage of the embodiment of the invention shown in FIG. 7.

FIG. 9 is a plan view, partly in cross-section, illustrating a further use of the present invention.

FIG. 15 is a perspective view of a solar distiller which can be utilized in combination with the present invention.

FIG. 16 is a cross-sectional view of a solar distiller taken along the line 16—16 in FIG. 15.

DESCRIPTION OF THE PREFERRED EMBODIMENTS

Figure 10:
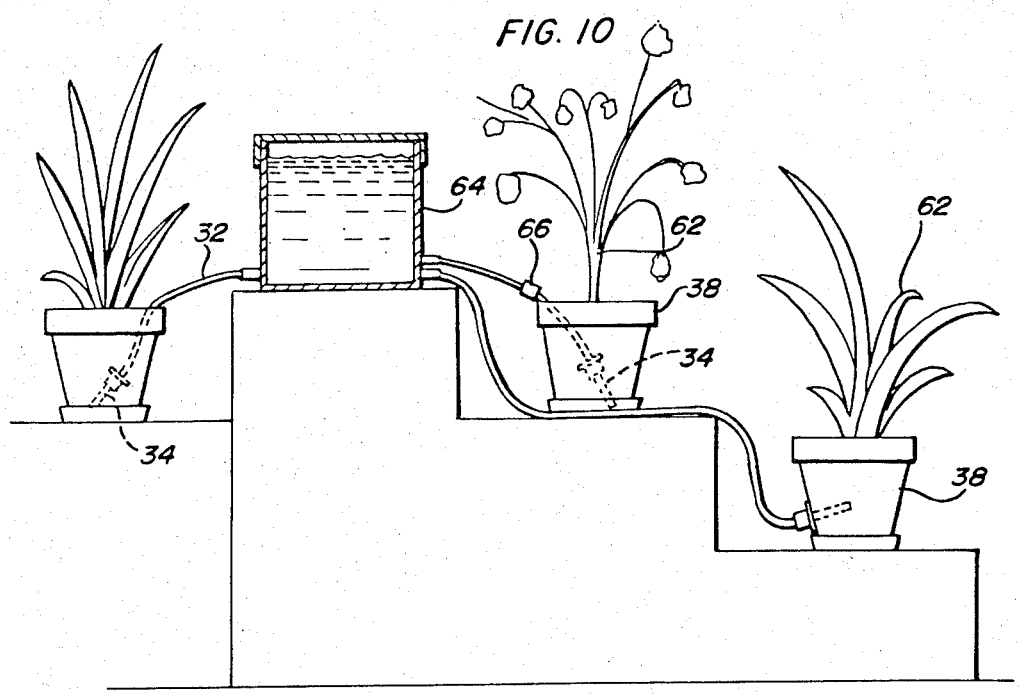
FIG. 10 is a detailed plan view of the invention showing the same in an alternative usage environment.

With reference now to the drawings, and in particular to FIGS. 1-3 thereof, a new and improved apparatus utilizable in conjunction with the method of the present invention and generally designated by the reference numeral 10 will be described. In this respect, the apparatus 10 includes a tubular ceramic element 12 which is of a porous construction, typically having pores of an average pore size, e.g., three micrometers. Attached to opposed ends of the ceramic element 12 are end caps 14 which may be of a plastic construction and which may be selectively attached to the ceramic element by some conventional means, such as through the use of an epoxy adhesive, or the like.

With particular reference to FIGS. 2 and 3 of the drawings, it can be seen that the tubular construction of the ceramic element 12 includes a through-extending interior chamber 16 into which a liquid or gas may be introduced in a manner yet to be described. Additionally, FIGS. 2 and 3 illustrate in a schematic manner a plurality of radially directed, through-extending apertures or channels 18 which are designed to be representative of the porous construction of the element 12. Of course, it is to be understood that the channels 18 per se do not actually exist in their illustrated manner, but that rather a large number of smaller channels directed in a multitude of random directions selectively interconnect in a known manner to form the porous construction.

With further reference to FIG. 2 of the drawings, it will be noted that the end cap 14 may be designed to have an interior diameter portion 20 which facilitates a snug positioning of the cap over a respective end 22 of the ceramic element 12. Epoxy adhesive 24 is generally illustrated as being utilized to effect the attachment of the cap 14 to the element 12 in the above-mentioned manner. If desired, an interior smaller diameter chamber 26 may be positioned within the first-mentioned interior diameter portion 20, whereby the channel 26 operates to serve as a holding chamber for the liquid or gas being dispensed through the tubular chamber 16.

The cap member 14 further includes an integral extending nipple 28 having a beveled ridge 30 whereby a length of flexible conduit 32, such as plastic tubing or the like, can be selectively positioned over the nipple in a well understood manner. As shown in FIG. 1, the apparatus 10 is designed to be serially positioned within a length of the tubing 32 whereby a liquid or gas being directed through the tubing will pass through the tubular chamber 16 within the element 12 and then possibly be directed to a further porous element 12 positioned in another selected location.

While FIGS. 1-3 illustrate a construction of the invention 10 whereby the same is designed for serial interconnection with a gas or liquid-supplying conduit 32, it is to be understood that many variations in design of the apparatus 12 as shown are within the intent and purview of the invention. For example, FIG. 4 illustrates the ceramic element 12 as being provided without the above-described end caps 14. In this simplified embodiment of the invention, the conduit 32 is representatively illustrated as being directly insertible within the chamber 16 and if desired, some form of adhesive or sealant could be utilized to protect against leakage at the connection points. This simplified embodiment of the invention, as with the embodiment above-described with reference to FIG. 1, could be provided in preassembled rolls whereby substantial lengths of conduit 12 and the serially interconnected ceramic elements 12 could be positioned in a field to be irrigated or fertilized in one simple operation. Accordingly, it is within the intent of the invention to include various commercial applications and manners of packaging which would be considered obvious in the art and which are not specifically discussed herein.

FIG. 5 illustrates a modified embodiment of the invention wherein only a single end cap 14 is utilized. As shown, a ceramic element 34 is attached in the aforedescribed manner to a single end cap 14, while the ceramic element may be of a totally solid construction or alternatively, it may be provided with a partially through-extending aperture as indicated by the broken lines 36. As can be appreciated, water, or some other liquid or gas, will accumulate in the aperture 36 and seep through the porous structure of the ceramic element 34 in a now understood manner. As with the priorly discussed embodiments of the invention, a small capillary tube 32 is connectible to the nozzle or nipple portion 28 of the end cap 14, with such capillary tube being utilized to deliver the liquid to the chamber 26 and the aperture 36.

FIG. 5 further illustrates one of many different uses of the invention. More specifically, the ceramic element 34 is positionable within a flower pot 38. A bore hole 40 is drilled near the bottom 42 of the flower pot 38 with the end cap 14 being snugly positioned within the bore as illustrated. Some conventional attachment means, such as the use of epoxy cement 44, can then be utilized to securely affix the end cap 14 to the pot 38, and the ceramic element 34 will then be directed inwardly into the interior chamber 46 of the pot. A layer of supporting soil 48 should be positioned beneath the ceramic element 34 to further support it in position before the roots of a plant and potting soil are utilized to fill the remaining portion of the pot 38. This construction of the invention then basically illustrates a manner of utilizing the invention to water or fertilize potted plants.

FIG. 6 illustrates another use of the invention 10 wherein an aperture 50 has been drilled in a tree 52. While a more detailed discussion of this manner of usage of the invention 10 will be subsequently provided, it will be noted that the ceramic insert 34 may be positioned in the aperture 50 with the end cap 14 being in an abuttable relationship with the cambium 54 of the tree. Direct liquid or gas feeding to the tree 52 may then be provided in an apparent manner. However, it should be noted that pressurized or forced feeding of a liquid to the tree 52 is not within the intent or purview of the invention, but rather such liquid or gas delivery to the tree is in proportion to the sensed negative sap pressure within the tree per se, i.e., the tree will absorb only that amount of liquid or gas which is actually needed.

FIGS. 7 and 8 illustrate another discovered usage of the invention 10. In this embodiment, the ceramic element 34 may be provided with a concave depression in which a seed 58, such as a tomato seed, or the like, may be selectively attached, desirably through the use of some gluing medium such as flour, sorghum molasses, etc. As shown in FIG. 8, with a supplying of water and other nutrients through the capillary tube 32, a plant 60 will sprout and grow from the seed 58.

Figure 11:
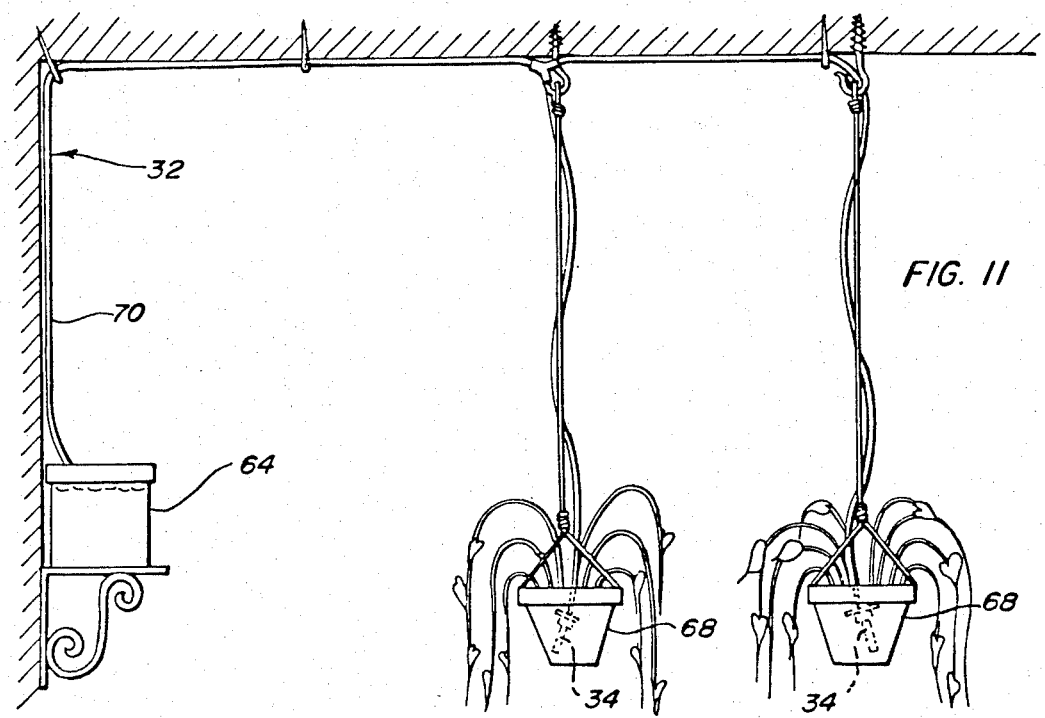
FIG. 11 is a detailed plan view showing even a further way of utilizing the present invention.

FIGS. 9, 10 and 11 have been provided to illustrate other methods of utilizing the invention 10. As shown in FIG. 9, the embodiment of the invention 10 priorly discussed in relation to the FIG. 5 illustration thereof may be simply positioned in the soil 48 contained within a flower pot 38 without having to be necessarily attached through an aperture 40 bored in the pot. In this method of utilizing the invention 10, the capillary tube 32 is simply buried in the soil 48 along with the ceramic implant 34, and liquid will then seep through the implant in a now well understood manner so as to provide nutrition to a plant 62 growing in the pot 38.

FIG. 10 illustrates a usage of one or more of the ceramic implants 34 in a plurality of flower pots 38. In this construction, a liquid feed reservoir 64 may have a plurality of capillary tubes 32 extending outwardly therefrom and feeding the respective ceramic elements 34. This arrangement provides for the liquid feeding of a plurality of plants 62 at the same time without the necessity of frequent attention by the plant owner. As further illustrated, quick connect and disconnect couplings 66 are provided to facilitate the exchange of potted plants 62. Similarly, FIG. 11 illustrates an arrangement whereby a single feed reservoir 64 may be utilized to supply liquids to a plurality of hanging potted plants 68. This latter arrangement illustrates the fact that liquids suctionated by roots from the ceramic elements 34 will create enough negative pressure within the capillary tube 32 to facilitate liquid movement through the tube from the feed reservoir 64, such as through the section of tubing 70. A slight amount of head (3"-18") is necessary to keep liquid available to ceramic element.

Figure 12:
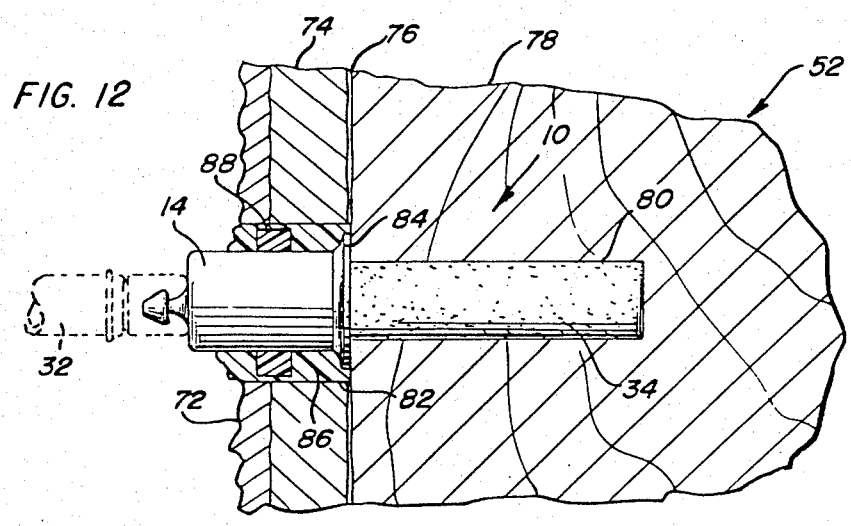
FIG. 12 is a partial cross-sectional view illustrating a manner of attaching the present invention to a tree.
Figure 13:
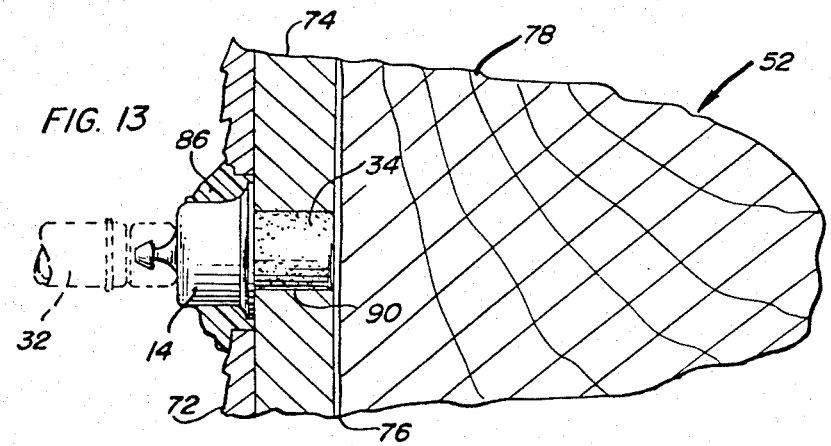
FIG. 13 is a partial cross-sectional view illustrating a further method of attaching the invention to a tree.
Figure 14:
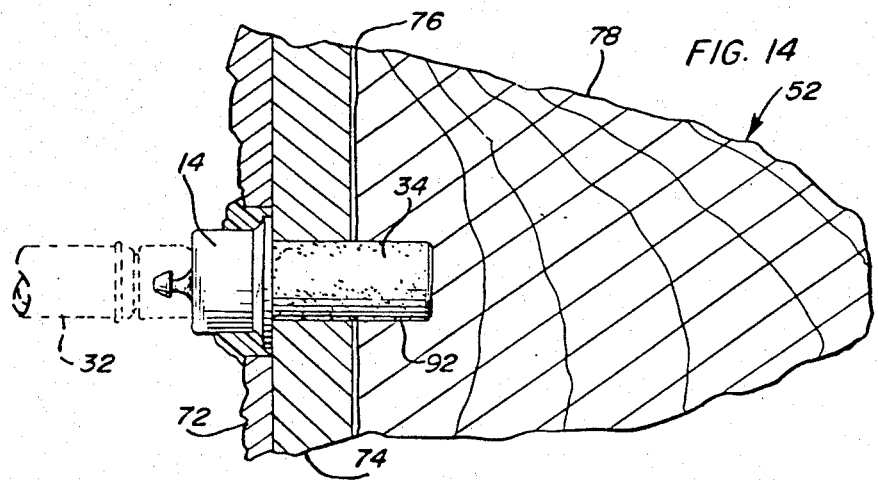
FIG. 14 is a partial cross-sectional view illustrating an even further manner of utilizing the presnet invention in conjunction with a tree.

FIGS. 12, 13 and 14 more specifically illustrate the mounting of the invention in a tree 52, with each of the illustrated mountings serving a very specific purpose. In this regard, it should be understood that a tree trunk essentially consists of four layers of plant tissue wrapped around one another. These layers, from outermost to innermost, are the cork or outer bark 72, the phloem or inner bark 74, the cambium 76, and the xylem or sapwood 78. The bark 72 protects the tree, while the phloem 74 is a layer of soft tissue surrounding the cambium 76 and it carries food made by the leaves to other parts of the tree. It is composed of a plurality of tiny pipelines that carry water, which is more appropriately called sap, downwardly from the leaves to the various parts of the tree. The cambium 76, which surrounds the xylem 78, is a thin layer of growing tissue, with its job being to make the trunk, branches, and roots grow thicker. The xylem 78 is the woody, central part of the trunk and like the phloem 74, it has tiny pipelines that carry sap with a small amount of dissolved minerals from the roots to the leaves. As such, sap movement in the xylem 78 is in an upward direction from the roots towards the leaves.

When the invention 10 is mounted in a tree 52 in the manner shown in FIG. 12, a first diameter aperture 80 is drilled into the tree and extends into the xylem 78. A second and larger diameter aperture 82 is then concentrically drilled with respect to the first aperture 80, with the second aperture extending through the phloem 74 and ending at the cambium 76. The ceramic element 34 is of such a length as to extend completely into the first aperture 80 with the end cap 14 being contained within the second aperture 82. As shown, a flanged portion 84 of the end cap 14 will abut against the cambium 76 and the remaining space within the aperture 82 may then be filled with a sealant, such as silicone 86. A plastic washer 88 may be slidably positioned over the end cap 14 and may be used to pressurize the silicone 86 by sliding the same inwardly towards the flange 84. Once the silicone 86 has dried, a pressurized seal is effected. In this manner of mounting the invention 10 within a tree 52, liquid or gas delivery is provided through the ceramic element 34 only to the xylem (negative sap pressure area) 78 whereby the delivered liquid or gas will be carried to the limbs and leaves of the tree.

In FIG. 13, an aperture 90 is drilled in the tree 52 with such aperture extending only to the cambium 76. As illustrated, the ceramic element 34 may then be completely retained within the aperture 90 so as to be only be in communication with the phloem 74 and with the end cap 14 then being sealingly retained against the tree 52 by a layer of silicone 86. In this manner of attachment, fluid communication is effected only between the ceramic element 34 and the phloem 74. Where the positioning of the ceramic implant 34 is in the manner illustrated in FIG. 12, liquid seepage into the xylem 78 is accomplished through negative sap pressure as aforediscussed. When the ceramic implant 34 is positioned as illustrated in FIG. 13, however, a positive sap pressure is experienced around the ceramic element whereby the sap may be actually extracted from the tree 52. This type of arrangement is particularly advantageous where it is desirous to take the healthy sap from one tree 52 and deliver the same to the xylem 78 of another tree which is perhaps not so healthy.

FIG. 14 illustrates a positioning of the ceramic element 34 within an aperture 92 with the element actually extending and being in fluid communication with both the phloem 74 and the xylem 78, thereby to permit an interaction of liquids from positive to negative sap pressure. More particularly, some sap would be absorbed through the ceramic element 34 in the phloem 74 and would then be delivered with the liquid flowing inwardly through the capillary tube 32 back to the xylem 78. This arrangement might be desirous in certain cultural situations.

Inasmuch as the present invention 10 very substantially reduces the amount of water required to irrigate fields, and the like, FIGS. 15 and 16 illustrate a representative embodiment of a passive solar distiller 94 which could be utilized in combination with the various aforedescribed ceramic implants 12, 34. As is well known in the art, passive solar distillers are those types of devices which capture the sun's rays and utilize the heat generated thereby to evaporate water from some impure liquid, such as saltwater, or the like. The evaporated wate is then condensed to form distilled water and is captured for future use. In the solar distiller 94, it will be seen that the same includes a rectangularly-shaped housing 96 positioned on an optional support structure 98. The support structure 98 actually forms no part of the present invention but is simply illustrative of the fact that some supporting structure may be required for the housing 96. By the same token, it is to be understood with respect to the description yet to be provided that the housing 96 and the other parts of the solar distiller 94 could be of any form or shape, and could include any manner of operation, which would accomplish the desired result of obtaining distilled water for supplying an irrigation system utilizing the present invention 10.

With further reference to FIGS. 15 and 16, it will be noted that the rectangular housing 96 includes an open top portion 100 which may be covered by a layer of transparent material, such as glass or plastic 102. Inasmuch as the glass 102 is illustrated as being angulated upwardly from the top portion 100, side panels of glass 104, 106 may also be utilized, while a back panel 108 could be of a solid non-transparent construction and could be painted white to assist it in the reflection of the sun's rays. As shown in FIG. 15, the back panel 108 could be sloped forwardly over the top opening of the housing 96 or alternatively, as shown in FIG. 16, the back panel 108 could constitute a vertically extending back wall of the housing 96.

The passive solar distiller 94 is further provided with a darkly colored bottom 110, such as might be accomplished through the use of black paint, and the impure liquid 112 is then delivered to the housing 96 in a sufficient quantity to substantially cover the bottom. The bottom, of course, retains heat and causes a concurrent heating of the liquid 112. The rising evaporated water then condenses on the interior surface of the glass cover 102, and the droplets of condensed water flow downwardly along the interior sloped surface of the glass for delivery into a collection trough 114. The collection trough 114 extends along the entire width of the lower end of the glass top 102 so as to be in a position to collect all of the flowing condensate which flows downwardy along the interior surface of the glass. An outlet connection 116 may be connected to the condensate trough 114, and the aforementioned capillary tube 32 may then be connected to the outlet to facilitate delivery of the distilled water to an irrigation system.

As can be appreciated, the evaporation of an impure liquid 112, such as saltwater, or the like, will result in a large amount of residue accumulating on the bottom 110 of the housing 96. Particularly in the case of saltwater, salt will accumulate and since the salt is of a white color, the efficiency of the solar distiller 94 will be greatly reduced once the dark colored bottom 110 is completely covered with the salt. To provide a continual dark colored heat collecting bottom surface, the distiller 94 is illustrated as being combined with a selectively movable roll of black polyethylene film 118 having a continuous sheet directed through the housing 96 and lying proximate the bottom 110. Once a portion 120 of the sheet has become covered with a light colored residue, it may be selectively moved, either manually or by some automatic mechanical means, whereby a new dark portion may be utilized to cover the bottom 110. Opposed end slots 122 may be provided in the housing 96 through which the polyethylene sheet 120 is directed, and these slots may be raised upwardly from the bottom 110 by some desired amount so that the sheet 120 drops downwardly in the first slot 122 and then slopes back upwardly through the second slot. The water level of course would be maintained below the level of the slots 122 so as to prevent leakage from the housing 96. Additionally, a brackish water and waste overflow tube 124 may be provided in the housing to facilitate residue removal.

In summary, an invention has been described which relates to the supplying of liquids, such as water and dissolved nutrients, and gases, such as anhydrous ammonia and carbon dioxide, in amounts adequate for growth in plants. The invention is intended to additionally include the entire Stoichiometric technique concept of a plant having the option to call for, or suctionate, the desired amount of liquid (water, fertilizer, trace elements, diseased treatment chemicals, all forms of micro-nutrients, metabolism modification chemicals and ingredients) and gases (carbon dioxide, anhydrous ammonia and other desirable mixtures). As above-discussed, the ceramic tube implant may be designed as a blind end hollow tube or a solid ceramic cylinder, and these implants may be installed into the trunk of a tree (above ground or below ground level), branches, or roots. One or more per plant may be installed and the ceramic tubes may be supplied on laterals from a pipeline.

Further summarizing, the size (diameter and length) may be varied according to the size of the plant to be implanted, and the implant could be formed in most any shape, although round units lend themselves to easier installation by utilizing drill bits for making insertion holes. As such, the implant comprises a uniquely designed piece of fired clay forming a ceramic piece that a plant does not reject. The intent of the present invention then includes the method of supplying liquids or gases to at least one plant using a pipeline having, at locations near plants to be irrigated, a porous ceramic portion supplied with nutrients by the pipeline, with the ceramic portion having open pores of a size permitting nutrients and gases dissolved in the liquid to pass through, but being too small to allow plant cells to invade the pours of the implant.

With respect to the construction of the apparatus of the invention the open-port ceramic body is formed from mixing unfired ceramic material with a finely divided powder of a material which will burn away at the firing temperatures encountered in firing the body. During firing, the powder and some of the carbon in the unfired ceramic material will burn away to leave the open pores. The powder may be of any suitable material such as carbonaceous material, but should not be one which produces large volumes of gas in decomposition. Farinaceous products may be used for the powder, with plain flour being particularly suitable. Other suitable materials include finely ground saw dust, coal dust, starch, ground vegetable peelings, waste paper and pulverized fuel ash.

Further, it should be noted that any conceivable fluid could be delivered to a plant, to include growth promoters other than conventional fertilizers, flavor promoting substances, aroma promoting substances, color promoting substances, dyes that control solar energy to leaves like a filter on a camera, etc. In effect, the present invention has solved the problem of providing the least quantity of water to the soil and the most to the plant.

As to the manner of operation and use of the present invention, the same is made apparent from the foregoing discussion. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention; for example the use of any kind of porous material, natural or artificial, not rejected by the plant.

Note: The word liquid used hereafter in these claims means liquids with dissolved substances for the well being of plants and gases.

What is claimed as being new and desired to be protected by Letters Patent of the United States is as follows:

1. A method of irrigating a tree, said method at least including the steps of:
    (a) providing a microporous fluid receiving implant therein, and a porous wall section of said implant in communication with a fluid source at atmospheric pressure and a non-porous cap section;
        (i) said porous wall section being generally cylindrical in configuration, and permitting fluid flow from said fluid source by means of a plurality of pores in said porous wall;
        (ii) said non-porous cap section being mounted on an end of said porous wall section and having a head channel passing therethrough, said head channel providing fluid flow communication between an outside of said cap section and said porous wall section; said cap section being substantially cylindrical and of greater diameter than said porous wall section;
    (b) providing said fluid source in communication with said implant for transmitting fluid to said porous wall section;
        (i) said fluid source including a reservoir receptacle and a flexible fluid conduit, said flexible conduit selectively providing fluid flow between said reservoir receptacle and said head channel and selectively providing a continual column of water communicating with said head channel;
    (c) providing a bore in said tree;
        (i) said bore extending through bark, phloem and cambium portions of said tree and terminating in a sapwood portion of said tree;
    (d) implanting said implant in said tree bore with said implant porous wall section snugly received within a portion of said bore in said sapwood portion; and with said porous wall section substantially only providing fluid flow communication between said fluid source and said tree sapwood portion; said implanting resulting in said implant head section generally abutting said tree sapwood;
    (e) sealing said implant within said tree and generally covering portions of said tree exposed by said bore; and
    (f) engaging said fluid reservoir with said head channel to provide fluid flow into said porous wall section and said tree sapwood at a rate determined by said tree, without external pressure forcing said fluid into said tree;
    (g) whereby fluid from said fluid reservoir may be directly transmitted into said tree sapwood without significant fluid flow communication with said cambium and phloem portions of said tree; and
    (h) whereby said tree is irrigated without substantial loss from evaporation or subsoil infiltration; and
    (i) whereby said tree sapwood receives irrigation fluid substantially only in response to a negative sap pressure in said sapwood causing said water to be taken up by said tree substantially in stoichiometric relation to use of said tree of said fluid in photosynthesis, and without substantial fluid waste through transpiration.

2. The method according to claim 1 wherein:
    (a) each of said pores is approximately three micrometers in diameter.

3. A method of providing water to a tree for use by said tree substantially in stoichiometric relationship to its use in photosynthesis, said method including the steps of:
    (a) providing a microporous implant having a fluid receiving inner portion, a porous wall section and a non-porous head section;
    (b) providing a bore in said tree, said tree bore extending through outer bark, phloem, and cambium portions of said tree and terminating within a portion of sapwood material in said tree;
    (c) implanting said implant in said tree bore with said implant porous section substantially only providing fluid flow communication between said tree sapwood and said implant fluid receiving inner portion, and with said non-porous head section generally extending through said tree bark, phloem, and cambium sections;

(d) providing a continual column of water communicating with said implant fluid receiving inner portion under no pressure, other than atmospheric pressure, for allowing said water to flow into said tree sapwood only at a rate substantially determined by a need of said tree for said water;

(e) whereby water from said fluid source may be transmitted directly into said sapwood without significant fluid flow communication with said cambium and phloem portions of said tree; and (f) whereby said tree sapwood receives irrigating water substantially only in response to a negative sap pressure in said sapwood causing said water to be taken up in said tree substantially in stoichiometric relation to use by said tree of water in photosynthesis, and without substantial water waste through excess transpiration.

4. The method according to claim 3 including the step of:

(a) providing a fluid seal around said implant between said non-porous head and the sapwood portion of said tree.

5. The method according to claim 3 including the step of:

(a) simultaneously fertilizing said tree by dissolving nutrients in said water and transmitting said nutrients directly into said tree sapwood;

(b) whereby nutrients are provided to said tree without substantial loss of nutrient material to the soil and without significant loss of transfer of said nutrients to surrounding non-productive plants such as weeds; and (c) whereby said nutrient material is directly transmitted to the tree sapwood for transfer to locations in said tree where said nutrients are used.

* * * * *